(12) United States Patent  
Pugia et al.

(10) Patent No.: US 10,670,500 B2  
(45) Date of Patent: Jun. 2, 2020

(54) FEEDBACK CONTROL FOR IMPROVED RARE CELL DETECTION

(71) Applicant: SIEMENS HEALTHCARE DIAGNOSTICS INC., Tarrytown, NY (US)

(72) Inventors: Michael Pugia, Granger, IN (US); Julia Philip, South Bend, IN (US); Karen Marfurt, Edwardsburg, MI (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 330 days.

(21) Appl. No.: 15/322,855

(22) PCT Filed: Jul. 2, 2015

(86) PCT No.: PCT/US2015/038994  
§ 371 (c)(1),  
(2) Date: Dec. 29, 2016

(87) PCT Pub. No.: WO2016/004311  
PCT Pub. Date: Jan. 7, 2016

(65) Prior Publication Data  
US 2017/0131191 A1    May 11, 2017

Related U.S. Application Data

(60) Provisional application No. 62/019,964, filed on Jul. 2, 2014.

(51) Int. Cl.  
*G01N 1/00* (2006.01)  
*G01N 1/40* (2006.01)  
(Continued)

(52) U.S. Cl.  
CPC ....... *G01N 1/4077* (2013.01); *G01N 15/0272* (2013.01); *G01N 35/00* (2013.01);  
(Continued)

(58) Field of Classification Search  
CPC ...................................................... G01N 1/00  
See application file for complete search history.

(56) References Cited

U.S. PATENT DOCUMENTS 4,173,415 A    11/1979    Wyatt  
2006/0281143 A1    12/2006    Liu et al.  
(Continued)

FOREIGN PATENT DOCUMENTS

WO    2004009840    1/2004  
WO    WO-2004009840 A1 *    1/2004    ............... C12Q 1/04

OTHER PUBLICATIONS

International Search Report for PCT/US2015/038994 dated Sep. 30, 2015.

*Primary Examiner* — Jyoti Nagpaul

(57) ABSTRACT

There is provided a system (10) and method (100) for improving ICC and/or ISH rare cell detection by lowering background noise and providing enhanced detection of rare cells (15). In an embodiment, background noise for an ICC and/or an ISH rare cell detection assay is reduced and rare cell signaling is enhanced via feedback control. To accomplish the feedback control, an electronic control circuit (24) can direct a fluid delivery apparatus (18) to add an adjustment amount to account for fluid loss in the system (10) when fluid loss is indicated.

20 Claims, 5 Drawing Sheets

(51) Int. Cl.
*G01N 15/02* (2006.01)
*G01N 35/00* (2006.01)

(52) U.S. Cl.
CPC ........ *G01N 2001/4088* (2013.01); *G01N 2015/0288* (2013.01); *G01N 2035/00475* (2013.01)

(56) References Cited

U.S. PATENT DOCUMENTS

| | | |
|---|---|---|
| 2008/0038738 A1 | 2/2008 | Weigum et al. |
| 2010/0136556 A1 | 6/2010 | Friedberger et al. |
| 2014/0106388 A1 | 4/2014 | Bangert et al. |
| 2014/0110349 A1 | 4/2014 | Bangert et al. |

* cited by examiner

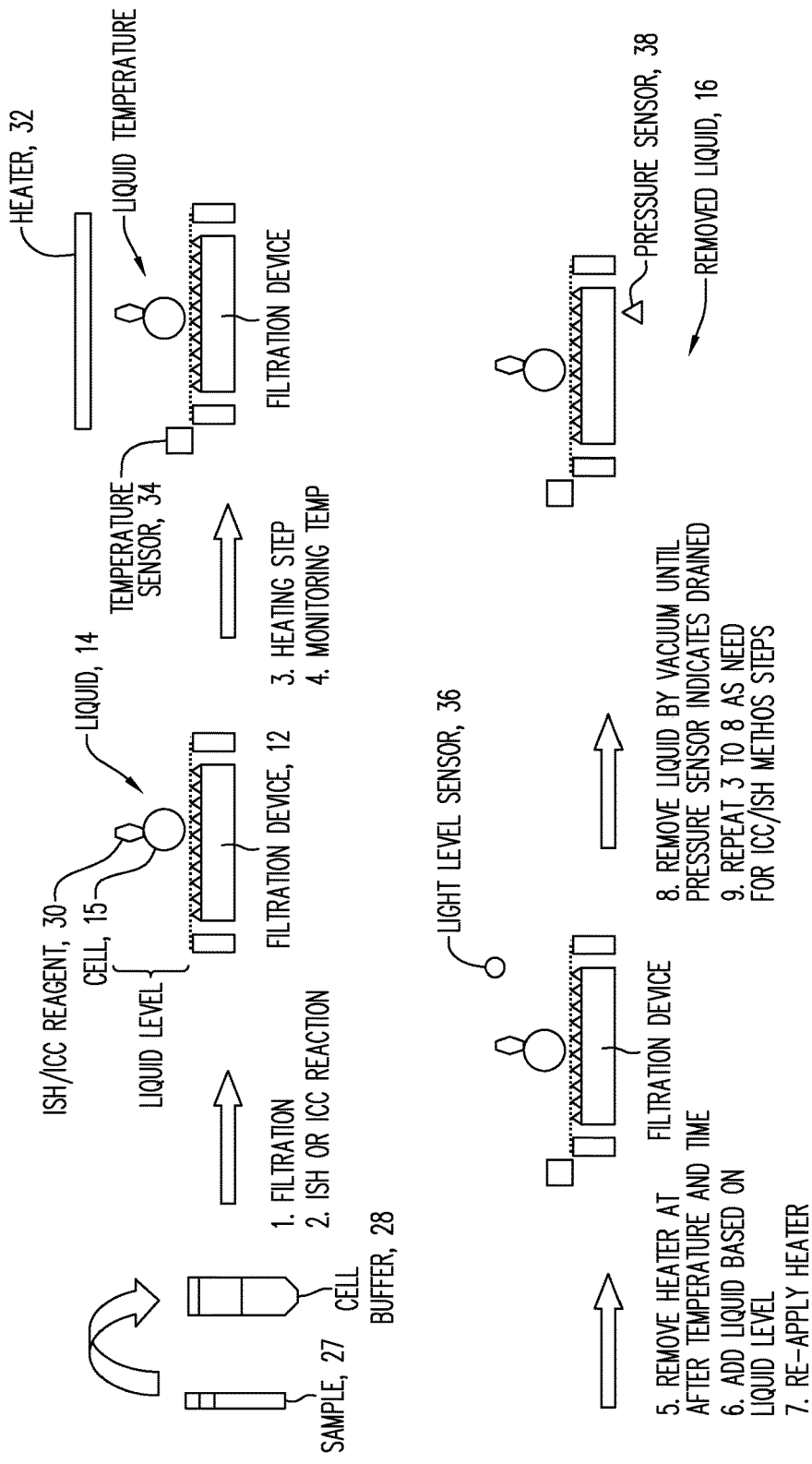

FEEDBACK CONTROL FOR IMPROVED RARE CELL DETECTION

FIELD OF THE INVENTION

The present invention relates to cellular assays, and more particularly to systems and methods for improved ICC and/or ISH rare cell detection.

BACKGROUND OF THE INVENTION

Rare cell analysis is important in medical applications, such as for diagnosis of many diseases including cancers. These applications typically require isolation of certain cells of interest which represent only a small fraction of the analyzed sample. For example, rare cells such as circulating tumor cells ("CTC") are of particular interest in the diagnosis of metastatic cancers. In conventional methods, CTC are isolated from whole blood by first removing red blood cells ("RBC") by lyses. In a 10 mL blood sample, for example, a few hundred CTC may be separated from about 800,000,000 white blood cells ("WBC"). This requires methods with high separation efficiency and cell recovery rates.

For rare cells to be analyzed by conventional scanning microscopy methods or molecular methods such as next generation sequencing, normal cells (e.g., WBC) must be reduced to a ratio of 200 to 1 normal to rare cells (typically cancer cells) and the sample volume must be reduced from 10 mL to a few hundred microliters or less.

Several approaches have been developed to date to capture, isolate, and enrich rare cells. One approach is to deplete the WBC from a whole blood sample (e.g., negative depletion). Another approach is to enrich the CTC in a whole blood sample (e.g., positive enrichment). Both of the above approaches rely on a variety of techniques, such as magnetic particles, filtration, flow cytometry, and microfluidic channels and chambers to conduct the rare cell analysis.

Recently, a novel approach to the automation of filtration was developed by Gumbrecht of Siemens. The approach is directed to a microfluidic slide format as shown in US 20120315664, which may be combined with a differential pressure hold as shown in WO 2012159821. The system and method allow for automation of membrane filtration with high recovery of rare cells, such as a >99% reduction of WBC and with complete red blood cell (RBC) removal. In addition, for a whole blood sample containing 1000 cancer cells, the ratio of WBC to cancer cells may be decreased from 50,000-100,000:1 to <200:1. Rare cells may then be measured using an immunocytochemistry (ICC) and/or in-situ hybridization (ISH) method.

Immunocytochemistry (ICC) methods use antibodies as an affinity partner for a corresponding rare cell. In-situ hybridization (ISH) methods, on the other hand, use a nucleic acid probe as the affinity partner. ICC and ISH may be performed individually or may be combined with one another such that rare cells are targeted by both an antibody and a nucleic acid for enhanced detection. For example, an ISH method is often done in a combination assay with a subsequent or prior ICC method with or without a subsequent cytological morphology by chromogenic dye staining (Hematoxylin & Eosin (H&E)) staining. See Farace F., et al., Detection of circulating tumor cells harboring a unique ALK rearrangement in ALK-positive non-small-cell lung cancer, J. Clin. Oncol. 2013 Jun. 20; 31(18):2273-81. In a combined assay, the ICC reaction may be done and the slide read on as microscope. Next, the slide may be washed to remove antibodies and the ISH reaction is completed. The ISH reaction may be read on the microscope and the images overlapped. When performed, the final H&E staining eliminates the ISH reaction and is also read on the microscope, and the images may be overlapped.

Automation of ICC and/or ISH requires specific method steps to lower the background and increase the signals observed. There are known causes of background noise or low signals (Cytometry 2001, Vol 43(2), p. 101-109) that may lead to false positive results. For example, background noise may arise due to non-specific binding of probe to nucleic acid sequences (which are not desired) or may arise due to non-specific binding of probe to non-nucleic acid material. Causes of lower signaling include non-exposure of the target nucleic acid, non-binding of the probe to the target, and reversal of binding such that the probe is washed away. In addition, background binding may increase with the temperature of the ICC and/or ISH reaction, either due to evaporation causing concentration increases in antibodies and probes or by driving non-specific binding events. Washing and blocking methods are commonly employed but are unable to sufficiently eliminate background.

Further, the combination of ICC and ISH has problems associated therewith. For example, the combination doubles background issues, requires additional heating steps, and adds additional considerations. For example, if ISH is run before ICC, the enzymatic digestion, post-fixation, denaturation, temperatures, and hybridization typically associated with ISH can destroy antigenic determinants and/or interfere with subsequent antibody bonding, thereby causing false negative or providing reduced rare cell detection. On the other hand, if ICC is run first, enzymatic digestion, stringent washing, and hybridization in formamide may break the antibody binding, and wash the antibody from the cell, thereby resulting in false negatives or reduced rare cell detection. This requires increased control of washing and temperature steps.

BRIEF DESCRIPTIONS OF THE DRAWINGS

FIG. 4 is a schematic illustrating a combination ICC/ISH assay in accordance with an aspect of the present invention;

DETAILED DESCRIPTION OF THE INVENTION

Figure 1A:
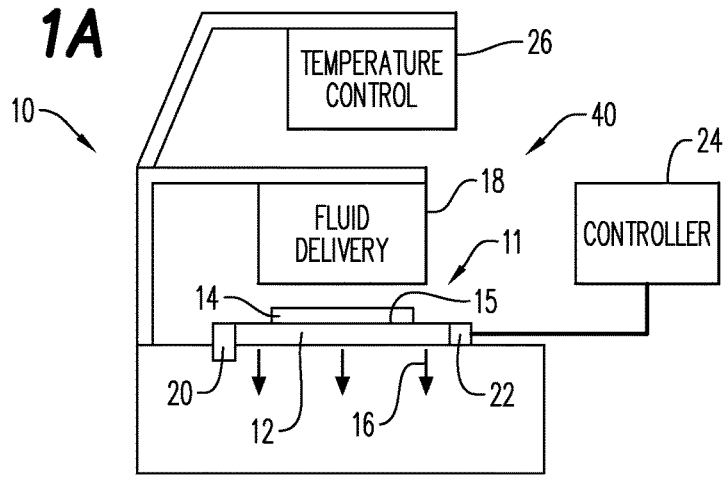
FIG. 1A-1B illustrates an automated system for the improved ICC and/or ISH rare cell detection in accordance with an aspect of the present invention.

Aspects of the present invention improve ICC and/or ISH rare cell detection by lowering background noise and providing enhanced detection of rare cells. In one aspect, background noise for ICC and/or ISH detection assays is reduced and rare cell signals are enhanced via a novel feedback control system and method, which can add further fluid as necessary based upon an indication of fluid loss. Feedback control thus ensures a proper concentration of components and optimal flow volume over the duration of the assay, which both reduces background noise and enhances signal detection. In addition, in certain aspects, a temperature control element is provided that can be positioned over a membrane of a filtration apparatus to optimize the temperature on the membrane. In certain embodiments, the temperature control element is movable from a first position over the membrane to a second position away from the membrane so as to allow for the addition of additional fluid (based upon the determined fluid loss) for an ICC and/or ISH detection assay in the second position.

In accordance with one aspect, there is provided an automated system for filtration of a sample and for rare cell detection in the sample. The system includes a filtration apparatus comprising a membrane through which the sample is passed to provide a retentate suspected of having a quantity of rare cells. In addition, the system includes a fluid delivery apparatus that introduces one or more fluids onto the membrane for filtration or detection of the rare cells. Further, the system includes a sensor disposed on or about the membrane to directly or indirectly indicate a level of fluid on the membrane. A controller, e.g., an electronic control circuit, is provided which is configured to:
  a) determine when an actual amount of fluid on the membrane is less than an expected amount of fluid on the membrane based upon information from the at least one sensor;
  b) determine an adjustment amount of fluid to add to the membrane; and
  c) direct the fluid delivery apparatus to add the adjustment amount to the membrane.

In a particular embodiment, the controller is configured to:
  a) upon receiving an indication from a pressure sensor of a change in the pressure from a predetermined threshold value at a point in time, determine an actual time lapsed for fluid to travel through the membrane from a starting time to the point in time;
  b) determine a theoretical time for fluid to travel through the membrane from the starting time to the point in time, wherein a difference between the theoretical time and the actual time is indicative of a more rapid than expected loss of the fluid;
  c) determine an adjustment amount of the fluid to add to the membrane from the fluid delivery apparatus based upon the difference between the actual time and the theoretical time; and
  d) direct the fluid delivery apparatus to add the adjustment amount to the membrane.

In accordance with another aspect of the present invention, there is provided an automated method for filtration of a sample and for rare cell detection in the sample, the method comprising:
  a) passing a sample through a membrane to provide a retentate suspected of having a quantity of rare cells;
  b) introducing a fluid onto the membrane for detection of the rare cells;
  c) determining when an actual amount of the fluid on the membrane is less than an expected amount of fluid on the membrane;
  d) determining an adjustment amount of fluid to add to the membrane when the actual amount of the fluid on the membrane is less than the expected amount of fluid; and
  e) directing the fluid delivery apparatus to add the adjustment amount to the membrane.

1.1 DEFINITIONS

Before explaining embodiments of the inventive concept(s) in detail by way of exemplary drawings, experimentation, results, and laboratory procedures, it is to be understood that the inventive concept(s) are not limited in its application to the details of construction and the arrangement of the components set forth in the following description or illustrated in the drawings, experimentation and/or results. The inventive concept(s) are capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed and claimed inventive concept(s) shall have the meanings that are commonly understood by those of ordinary skill in the art. Further, unless otherwise required by context, singular terms shall include pluralities and plural terms shall include the singular. Generally, nomenclatures utilized in connection with, and techniques of, cell and tissue culture, molecular biology, and protein and oligo- or polynucleotide chemistry and hybridization described herein are those well known and commonly used in the art.

The nomenclatures utilized in connection with, and the laboratory procedures and techniques of, analytical chemistry, synthetic organic chemistry, and medicinal and pharmaceutical chemistry described herein are those well known and commonly used in the art. Standard techniques are used for cellular assays, chemical syntheses, chemical analyses, pharmaceutical preparation, formulation, and delivery, and treatment of patients. All patents, published patent applications and non-patent publications mentioned in the specification are indicative of the level of skill of those skilled in the art to which this presently disclosed and claimed inventive concept(s) pertains. All patents, published patent applications and non-patent publications referenced in any portion of this application are herein expressly incorporated by reference in their entirety to the same extent as if each individual patent or publication was specifically and individually indicated to be incorporated by reference.

All of the systems, devices, and/or methods disclosed and claimed herein can be made and executed without undue experimentation in light of the present disclosure. While the compositions, systems, and methods of this presently disclosed and claimed inventive concept(s) may be described in terms of aspects or embodiments, it will be apparent to those of skill in the art that variations may be applied to the compositions, systems, and/or methods and in the steps or in the sequence of steps of the method described herein without departing from the concept, spirit and scope of the presently disclosed and claimed inventive concept(s). All such similar substitutes and modifications apparent to those skilled in the art are deemed to be within the spirit, scope and concept of the inventive concept(s) as defined by the appended claims.

As utilized in accordance with the present disclosure, the following terms, unless otherwise indicated, shall be understood to have the following meanings:

As used herein, the use of the terms "a" or "an" in conjunction with the term "comprising" in the claims and/or the specification may mean "one," but it is also consistent with the meaning of "one or more," "at least one," and "one or more than one."

As used herein, the term "or" means "and/or" unless explicitly indicated to refer to alternatives only or that the alternatives are mutually exclusive.

As used herein, the term "about" is used to indicate that a value includes the inherent variation of error for the device, the method being employed to determine the value, or the variation that exists among the study subjects.

As used herein, the phrases "amount effective," "effective amount," or the like refer to amounts at concentrations and for periods of time necessary to achieve the desired result.

As used herein, the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results.

As used herein, the terms "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, the phrase "or combinations thereof" refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAAB-CCCC, CBBAAA, CABABB, and so forth. The skilled artisan will understand that typically there is no limit on the number of items or terms in any combination, unless otherwise apparent from the context.

As used herein, the terms "affinity partner," "affinity reagent," "binding partner," or "probe" refers to any type of molecule that binds to a specific biomarker as described herein. Examples of probes include, but are not limited to, antibodies (or binding fragments or derivatives thereof), receptors, organic molecules, inorganic molecules, ligands, nucleic acids (including but not limited to, DNA, RNA, microRNA, mRNA, siRNA, etc.), peptides, polypeptides, proteins, epitopes, antigens, ligands, receptors, complexes, lipids, glycoproteins, glycolipids, glycosaminoglycans, carbohydrates, polycarbohydrates, glycoconjugates, and any combinations or derivatives thereof.

As used herein, the term "antibody" is used in the broadest sense, and specifically covers monoclonal antibodies (including full length monoclonal antibodies), polyclonal antibodies, multi-specific antibodies (e.g., bi-specific antibodies), and antibody fragments so long as they exhibit the desired biological activity. Thus, the terms "antibody" or "antibody peptide(s)" refer to a full length immunoglobulin molecule (i.e., an intact antibody), or a binding fragment thereof that competes with the intact antibody for specific antigen binding. Binding fragments may be produced by recombinant DNA techniques, or by enzymatic or chemical cleavage of intact antibodies. Binding fragments include Fab, Fab', F(ab')2, Fv, scFv, disulfide linked Fv, Fd, diabodies, single-chain antibodies, single domain antibodies (such as but not limited to, NANOBODIES®) and other antibody fragments that retain at least a portion of the variable region of an intact antibody. See, e.g., Hudson et al., Nature Med., 9:129-134 (2003).

As used herein, the terms "antigen binding fragment" or "antigen-binding portion" of an antibody, as used herein, refers to one or more fragments of an antibody that retain the ability to bind to an antigen. The antigen-binding function of an antibody can be performed by fragments of an intact antibody. Examples of binding fragments encompassed within the term "antigen-binding fragment" of an antibody include but are not limited to, Fab, Fab', F(ab')2, Fv, scFv, disulfide linked Fv, Fd, diabodies, single-chain antibodies, single domain antibodies (such as but not limited to, NANOBODIES®), isolated CD H3, and other antibody fragments that retain at least a portion of the variable region of an intact antibody. These antibody fragments are obtained using conventional recombinant and/or enzymatic techniques and are screened for antigen binding in the same manner as intact antibodies.

As used herein, the term "biomarker" as used herein will be understood to refer to any target site on the surface of or inside of a cell, e.g., a rare cell, that an affinity partner can have affinity therefor and thus can bind to said moiety. The "biomarker" may be, for example but not by way of limitation, a nucleic acid, peptide, polypeptide, protein, epitope, antigen, ligand, receptor, complex (i.e., an MHC-peptide complex), lipid, glycoprotein, glycolipid, glycosaminoglycan, carbohydrate, polycarbohydrate, glycoconjugate, and any combination or derivative thereof.

As used herein, the term "capture particle" as used herein will be understood to refer to particle that can be retained on the surface of the slide and is able to capture the "biomarker", e.g. in such an instance, a capture particle entity is added that comprises an "affinity partner," "affinity reagent," "binding partner," or "probe" for the proteins or nucleic acids, which binds to the "biomarkers" in the population over another population of "biomarker for purposes of carrying out an enhancement of a concentration of "biomarkers" in accordance with principles described herein. The composition of the particle of the capture particle entity may be organic or inorganic, magnetic or non-magnetic with silica coating applied. Organic polymers include, by way of illustration and not limitation, nitrocellulose, cellulose acetate, poly(vinyl chloride), polyacrylamide, polyacrylate, polyethylene, polypropylene, poly(4-methylbutene), polystyrene, poly(methyl methacrylate), poly(hydroxyethyl methacrylate), poly(styrene/divinylbenzene), poly(styrene/acrylate), poly(ethylene terephthalate), melamine resin, nylon, poly(vinyl butyrate), for example, either used by themselves or in conjunction with other materials and including latex, microparticle and nanoparticle forms thereof. The particles may also comprise carbon (e.g., carbon nanotubes), metal (e.g., gold, silver, and iron, including metal oxides thereof), or colloids.

As used herein, the term "label" or "imaging agent" refers to a functional group or molecule that produces or can be induced to produce a detectable signal. This signal may be measured by microscopic analyzers, mass spectroscopic analyzers, spectroscopic analyzers, fluorescent analyzers, or chemiluminence analyzers.

As used herein, the terms "peptide", "polypeptide" and "protein" refer to a polymer of amino acid residues. The term "polypeptide" is a generic term that refers to native protein, protein fragments, or analogs of a polypeptide sequence. Hence, native protein, protein fragments, and analogs are species of the polypeptide genus.

1.2 AUTOMATED FILTRATION AND RARE MOLECULE DETECTION SYSTEM

Now referring to the figures, FIG. 1 illustrates an automated system 10 configured for both filtration of a sample and for rare cell detection. To accomplish the filtration, the system 10 comprises a filtration apparatus 11. The filtration apparatus 11 comprises at least a membrane 12 through which the sample is passed to provide a retentate 14 suspected of having a quantity of rare cells 15 while allowing a permeate 16 comprising a quantity of non-rare cells to travel therethrough. In addition, the system 10 includes a fluid delivery apparatus 18 that introduces one or more fluids onto the membrane for filtration and/or useful in the detection of the rare cells 15. Further, the system 10 includes at least one sensor, e.g., sensors 20, 22, disposed on or about the membrane 12 to directly or indirectly determine an amount of fluid loss on the membrane 12. A controller 24, e.g., an electronic control circuit, is provided which is configured to correct for fluid loss on the membrane 12 as described herein. A detector, such as a fluorescence detector (not shown), may be provided in the system 10 for detection of rare cells. However, the invention is not so limited as the retentate may be removed from the system and carried or otherwise transferred to an independent detection system.

The filtration apparatus 11 may be any suitable instrument for separating a quantity of rare molecule from non-rare molecule, such as the rare cells separation set forth in US 20120315664, for example. Rare molecules that are not cell bound can be captured on "capture particle". As such, it is understood that membrane 12 may also be supported by a supporting member and/or a carrier. As such, it is understood that membrane 12 has pores of a diameter such that they retain the rare cells or the "capture particles" which are typically of a larger diameter than the pores. The filtration apparatus 11 may be one that is suitable for the filtration of, for example, tumor cells from a blood sample. With an appropriately sized hole diameter, for example, 8 μm, non-rare cells or non-rare molecules, such as white and red blood cells, can pass through the membrane 12 while rare cells (e.g., cancer cells), which are too large and inelastic are retained on the membrane 12. A uniform flow of fluid over the surface of the membrane 12 facilitates retention of the rare cells 15 in a form which, after filtering, lies substantially uniformly distributed on the membrane 12.

The membrane 12 may comprise a solid or semi-solid porous matrix, and may be comprised of organic or inorganic water insoluble material. The porous matrix can have any of a number of shapes such as, for example, tubular (e.g., hollow fiber, spiral wound, and hollow fine fiber), track-etched, or planar or flat surface (e.g., strip, disk, film, membrane, and plate). It is also appreciated that the matrix may be fabricated from a wide variety of materials, which may be naturally occurring or synthetic, polymeric or non-polymeric, fibrous or non-fibrous. The porous matrix can be produced by, way of illustration and not limitation, micro-electromechanical (MEMS) technology, laser machining, metal oxide semiconductor (CMOS) technology or micro-manufacturing processes for producing microsieves. Examples, by way of illustration and not limitation, of such materials for fabricating a porous matrix include cellulose (including paper), nitrocellulose, cellulose acetate, polycarbonate, poly (vinyl chloride), polyacrylamide, polyacrylate, polyethylene, polypropylene, poly-(4 methylbutene), poly- styrene, polymethacrylate, poly(ethylene terephthalate), nylon, and poly(vinyl butyrate), ceramic material, metallic material, for example, either used by themselves or in conjunction with one another and/or with other materials.

The size of the pores of the membrane 12 may be that which is sufficient to preferentially retain rare cells, e.g., agglutinated rare cells, while allowing the passage of other cells including non-rare cells through the pores. In certain embodiments, the pore size of the pores is dependent on the nature and size of the rare cells and the non-rare cells, the nature and size of the agglutinated rare cells, the pressure applied to the blood sample, for example. For example, without limitation, the average pore size may be about 1 μm to about 100 μm, or about 1 μm to about 75 μm, or about 1 μm to about 50 μm, or about 1 μm to about 20 μm, or about 1 μm to about 10 μm, or about 5 μm to about 100 μm, or about 5 μm to about 75 μm, or about 5 μm to about 50 μm, or about 5 μm to about 20 μm, or about 5 μm to about 10 μm, for example. The density of pores in the porous matrix may be about 1% to about 80%, or about 10% to about 80%, or about 20% to about 80%, or about 50% to about 80%, or about 20% to about 70%, for example.

As will be explained in further detail below, pressure is applied to the fluid on the membrane 12 to facilitate passage of fluid and non-rare cells through the membrane 12. As used herein, the term "pressure" refers to a pressure differential from normal atmospheric pressure, which may be either positive pressure (increase in pressure relative to normal atmospheric pressure) or negative pressure (vacuum) (decrease in pressure relative to normal atmospheric pressure). The level of pressure applied to the membrane 12 of the filtration apparatus 11 may be dependent on one or more of the nature and size of the non-rare cells, the nature and size of the agglutinated rare cells, the nature of the porous matrix, and the size of the pores of the porous matrix, for example.

In operation, permeate 16 is pressed through the membrane 12 and retentate 14 is retained on the membrane 12 (or also in the pores and cavities of the membrane 12). For the filtration process, there is thus a prevailing direction of flow of the permeate 16 through the membrane 12. In this way, there can be an area upstream of the membrane 12 where the retentate 14 is retained, and an area downstream of the membrane 12 where the permeate 16 is pressed and, for example, where it can be collected. Regardless of the prevailing direction of flow, the direction of flow can also be reversed, for example, when back washing the membrane 12. The term "pressing through" also defines the prevailing direction of the pressure differential: the positive pressure differential between upstream and downstream of the membrane 12. If the pressure differential were negative, it is understood that a suction force would be provided on the membrane 12.

In order to press the permeate 16 through the membrane, 12 the pressure differential may be characterized by a higher pressure upstream of the membrane 12 than downstream thereof. The higher pressure upstream may be accomplished by the application of overpressure upstream of the membrane 12, application of underpressure downstream of the membrane 12, or a combination of the two by any suitable structure(s) known in the art. In order to stop (to reduce to zero) the permeate flow through the membrane 12, a pressure differential of zero can be provided regardless of the orientation of the membrane 12. In the event that the direction of flow runs vertically on the filter or a vertical component (in other words, in the direction of, or contrary to the force of gravity), it is appreciated that the amount of fluid on the membrane 12 may contribute to the pressure differential. In certain embodiments, the direction of flow of filtration on the filter may run essentially in the direction of the force of gravity. As a result, retained retentate 14 comes to lie on the surface of the filter which, for example, enables further processing of the retentate.

By way of example only, the level of positive pressure applied to the membrane 12 may be about 1 millibar to about 500 millibar, or about 1 millibar to about 400 millibar, or about 1 millibar to about 300 millibar, or about 1 millibar to about 200 millibar, or about 1 millibar to about 100 millibar, or about 1 millibar to about 50 millibar, or about 1 millibar to about 30 millibar, or about 1 millibar to about 25 millibar, or about 1 millibar to about 20 millibar, or about 1 millibar to about 15 millibar, or about 1 millibar to about 10 millibar, or about 5 millibar to about 30 millibar, or about 5 millibar to about 25 millibar, or about 5 millibar to about 20 millibar, or about 5 millibar to about 15 millibar, or about 5 millibar to about 10 millibar, for example. If a negative pressure is applied to the membrane, it is appreciated that the level of negative pressure (vacuum) applied to the membrane 16 may be the negative of the above ranges.

In certain embodiments, the pressure applied to the membrane 12 is an oscillating pressure, which means that the pressure is applied intermittently at regular or irregular intervals. The intervals may be from about 1 second to about 600 seconds, or about 1 second to about 500 seconds, or about 1 second to about 250 seconds, or about 1 second to about 100 seconds, or about 1 second to about 50 seconds, or about 10 seconds to about 600 seconds, or about 10 seconds to about 500 seconds, or about 10 seconds to about 250 seconds, or about 10 seconds to about 100 seconds, or about 10 seconds to about 50 seconds, or about 100 seconds to about 600 seconds, or about 100 seconds to about 500 seconds, or about 100 seconds to about 250 seconds, for example. In this approach, pressure is oscillated at about 0 millibar to about 10 millibar, or about 1 millibar to about 10 millibar, or about 1 millibar to about 7.5 millibar, or about 1 millibar to about 5.0 millibar, or about 1 millibar to about 2.5 millibar, for example, during some or all of the application of pressure to the membrane 12. Oscillating pressure is achieved using an on-off switch, for example, and may be conducted automatically or manually. High pressure drops are allowable depending on one or more of reservoir volume, sample volume and filtration rate.

In the embodiment shown, the retentate 14 is shown as having a quantity of rare cells 15. The permeate 16 that passes through the membrane 12 may be collected in a suitable waste container (not shown) and discarded and/or recycled as desired.

The fluid delivery apparatus 18 may be in fluid communication with the filtration system 11. In addition, the fluid delivery apparatus 18 may be arranged so as to introduce one or more fluids onto the membrane 12 for detection of the rare cells 15 and may comprise an automatic robotic pipette system as is well-known in the art, for example, such as that commercially available form Hamilton Robotics, Eppendorf International, Thermo Scientific, and the like. The fluid delivery apparatus 18 may deliver all fluids or a portion of the fluids needed for the assay being performed.

It is appreciated that the one or more fluids may comprise any components (e.g., fluids) for carrying out a filtration process for the separation of a quantity of rare cells from non-rare cells. In an embodiment, the one or more fluids may further comprise a component useful for carrying out an ISH detection assay for detection of rare cells. Still, the one or more fluids may comprise a component necessary for carrying out an ICC detection assay, or a combination ICC/ISH detection assay for the detection of rare cells. By way of example, the one or more fluids may comprise a member selected from the group consisting of a probe, a label, a reagent, an amplifying agent, a buffer, a wash solution, and combinations thereof.

In a typical ICC and/or ISH assay, samples are mixed with buffer and separated through filtration onto the membrane 12, e.g., a porous microscope slide, to isolate predominantly rare cells (with some non-rare cells and no red blood cells). After isolation, the cells are fixed and washed. The process can be stopped for bio-banking slides with rare cells or continued on with automated procedures for molecular detection of proteins by ICC; of nucleic acid by ISH; and of cytological morphology by chromogenic dye staining (H&E). If an ICC and/or ISH assay is to be performed, suitable probes (labels) and signal amplification components are provided at this juncture. Alternatively, slides may be used to extract cellular material for other detection methods which are not automated in this procedure, such as PCR analysis for DNA.

In particular, ICC methods use antibodies as the affinity partner. In an embodiment, the fluid delivery apparatus 18 delivers an antibody specific for a biomarker on a rare cell. Antibodies may include a complete immunoglobulin or fragment thereof, which immunoglobulins include the various classes and isotypes, such as IgA, IgD, IgE, IgG1, IgG2a, IgG2b and IgG3, IgM, etc. Fragments thereof may include Fab, Fv, and F(ab')2, and Fab', for example. In addition, aggregates, polymers, and conjugates of immunoglobulins or their fragments may be used where appropriate so long as binding affinity for a particular molecule is maintained.

In situ hybridization (ISH) methods utilize a nucleic acid as the affinity partner for the rare cell. In an embodiment, the fluid delivery apparatus 18 instead or also delivers a nucleic acid specific for a biomarker for a rare cell on the membrane 12. The nucleic acid may be any polymeric form of nucleotides of any length, either deoxyribonucleotides or ribonucleotides, or analogs thereof. The following are non-limiting examples of polynucleotides: coding or non-coding regions of a gene or gene fragment, loci (locus) defined from linkage analysis, exons, introns, messenger RNA (mRNA), transfer RNA, ribosomal RNA, ribozymes, cDNA, recombinant polynucleotides, branched polynucleotides, plasmids, vectors, isolated DNA of any sequence, isolated RNA of any sequence, nucleic acid probes, and primers. A polynucleotide may comprise modified nucleotides, such as methylated nucleotides and nucleotide analogs. If present, modifications to the nucleotide structure may be imparted before or after assembly of the polymer.

The sequence of nucleotides may be interrupted by non-nucleotide components. A polynucleotide may be further modified, such as by conjugation with a labeling component. The terms "isolated nucleic acid" and "isolated polynucleotide" are used interchangeably; a nucleic acid or polynucleotide is considered "isolated" if it: (1) is not associated with all or a portion of a polynucleotide in which the "isolated polynucleotide" is found in nature, (2) is linked to a polynucleotide to which it is not linked in nature, or (3) does not occur in nature as part of a larger sequence.

Without limitation, rare cell type biomarkers include cancer cell type biomarkers, oncoproteins and oncogenes, chemo resistance biomarkers, metastatic potential biomarkers, endothelial cell typing markers and others. See Pugia WO2013044099 for further examples thereof. Cancer cell type biomarker include but are not limited to cytokeratins (CK) (CK1, CK2, CK3, CK4, CK5, CK6, CK7, CK8 and CK9, CK10, CK12, CK 13, CK14, CK16, CK17, CK18, CK19 and CK2, Epithelial cell adhesion molecule (Ep-CAM), N-cadherin, E-cadherin and vimentin. Oncoproteins and oncogenes with likely therapeutic relevance due to mutations include but are not limited to WAF, BAX-1, PDGF, JAGGED 1, NOTCH, VEGF, VEGHR, CAIX, MIB1, MDM, PR, ER, SEL5, SEMI, PI3K, AKT2, TWIST1, EML-4, DRAFF, C-MET, ABL1, EGFR, GNAS, PDL1, MLH1, RET, MEK1, AKT1, ERBB2, HER2, HNF1A, MPL, SMAD4, ALK, ERBB4, HRAS, NOTCH1, SMARCB1, APC, FBXW7, IDH1, NPM1, SMO, ATM, FGFR1, JAK2, NRAS, SRC, BRAF, FGFR2, JAK3, RA, STK11, CDH1, FGFR3, KDR, PIK3CA, TP53, CDKN2A, FLT3, KIT, PTEN, VHL, CSF1R, GNA11, KRAS, PTPN11, DDR2, CTNNB1, GNAQ, MET, RB1, AKT1, BRAF, DDR2, MEK1, NRAS, FGFR1, and ROS1. Endothelial Cell typing markers include, by way of illustration and not limitation, CD136, CD105/Endoglin, CD144/VE-cadherin, N-cadherin, E-cadherin CD145, CD34, Cd41 CD136, CD34, CD90, CD31/PECAM-1, ESAM, VEGFR2/Flk-1, Tie-2, CD202b/TEK, CD56/NCAM, CD73/VAP-2, claudin 5, ZO-1 and vimentin, for example with additional mutation expected to be available in the near future.

In certain embodiments, the rare cells 15 may be endothelial cells which are detected using markers, by way of illustration and not limitation, CD136, CD105/Endoglin, CD144/VE-cadherin, CD145, CD34, Cd41 CD136, CD34, CD90, CD31/PECAM-1, ESAM, VEGFR2/Fik-1, Tie-2, CD202b/TEK, CD56/NCAM, CD73/VAP-2, claudin 5, ZO-1, and vimentin.

In addition, the markers may be biomarkers that detect rare immune cells. For example, monocytes are indicated by CD45+, CD14+; T lymphocytes are indicated by CD45+, CD3+; T helper cells are indicated by CD45+, CD3+, CD4+; cytotoxic T cells are indicated by CD45+, CD3+, CDS+; β-lymphocytes are indicated by CD45+, CD19+ or CD45+, CD20+; thrombocytes are indicated by CD45+, CD61+; and natural killer cells are indicated by CD16+, CD56+, and CD3−. Furthermore, two commonly used CD molecules, namely, CD4 and CD8, are, in general, used as markers for helper and cytotoxic T cells, respectively. These molecules are defined in combination with CD3+, as some other leukocytes also express these CD molecules (some macrophages express low levels of CD4; dendritic cells express high levels of CDS).

ICC and ISH can be performed as "direct affinity assays" that conjugate a label, such as a fluorescent probe, to an affinity partner. The ICC and ISH methods may also be performed as an "indirect assay." An "indirect assay" may comprise a secondary affinity agent conjugated to a label where the secondary affinity agent binds the primary affinity partner as described above. For example, when using a TSA method, HRP can be directly linked to the affinity partner. Alternatively, HRP can be bound to a secondary antibody or probe which can bind to the affinity partner as an "indirect method." The HRP may also be bound to an affinity partner through a streptavdin binding interaction to biotin where either streptavdin or biotin is directly attached to the affinity agent (e.g., "conjugated").

In certain embodiments, the label is directly or indirectly bonded to the affinity partner. In either case, the fluid delivery apparatus 18 is configured to deliver an effective amount of components for the detection of rare cells 15. The probes used herein may be any molecule that produces or can be induced to produce a signal, and may be, for example, a fluorescer, a radiolabel, an enzyme, a chemiluminescer or a photosensitizer. The signal may be detected and/or measured by detecting enzyme activity, luminescence, light absorbance or radioactivity, depending on the nature of the label. The label can directly produce a signal and, therefore, additional components are not required to produce a signal. Numerous organic molecules, for example, fluorescers, are able to absorb ultraviolet and visible light, where the light absorption transfers energy to these molecules and elevates them to an excited energy state. This absorbed energy is then dissipated by emission of light at a second wavelength. Other labels that directly produce a signal include radioactive isotopes and dyes, for example. In some examples, the label is part of a signal producing system, which may include components other than the label for generating a signal in conjunction with the label.

In accordance with one aspect, the label is a fluorescent label. Various types of fluorescent labels, depending on the application and purpose, may be employed in accordance with aspects of the present invention. A different fluorescent label may be associated with multiple different affinity agents such that multiple fluorescent-labeled antibodies, for example, may be employed in any one assay conducted on an isolated rare cell preparation In certain embodiments, the label may be required to generate non fluorescent signals which can be measured by other means such as another aspect, or the label is a mass spectroscopic label, by microscopic analyzers, mass spectroscopic analyzers, spectroscopic analyzers, fluorescent analyzers, or chemiluminence analyzers Examples of suitable fluorescent labels are commercially available and sold under the trademarks BD Horizon™ V450 Pacific Blue™ AmCyan BD Horizon™ V500 (Em-Max 500 nm), Alexa Fluor®, FITC, R-phycoerythrin (R-PE), Texas Red®, APC, Cy™ PerCP and DyLight™. Examples of suitable fluorophores are described herein below. For example, but not by way of limitation, a comprehensive catalogue exists online at http://www.fluorophores.org (the entire contents of which are expressly incorporated herein by reference).

Further ample guidance regarding fluorophore selection, methods of linking fluorophores to various types of molecules, and methods of use thereof is available in the literature of the art [for example, refer to: Richard P. Haugland, "Molecular Probes: Handbook of Fluorescent Probes and Research Chemicals 1992-1994", 5th ed., Molecular Probes, Inc. (1994); U.S. Pat. No. 6,037,137 to Oncoimmunin Inc.; Hermanson, "Bioconjugate Techniques", Academic Press New York, N.Y. (1995); Kay M. et al., 1995. Biochemistry 34:293; Stubbs et al., 1996. Biochemistry 35:937; Gakamsky D. et al., "Evaluating Receptor Stoichiometry by Fluorescence Resonance Energy Transfer," in "Receptors: A Practical Approach," 2nd ed., Stanford C. and Horton R. (eds.), Oxford University Press, U K. (2001); U.S. Pat. No. 6,350,466 to Targesome, Inc. In particular embodiments, up to 5 labeled probes are provided and measured at different excitations and emission wavelengths in a single assay.

In certain embodiments, the label may require components to produce a signal, and the signal producing system would then include all the components required to produce a measurable signal as would be appreciated by the skilled artisan. Such other components may include substrates, coenzymes, enhancers, additional enzymes, substances that react with enzymatic products, catalysts, activators, cofactors, inhibitors, scavengers, metal ions, and a specific binding substance required for binding of signal generating substances. A further detailed discussion of suitable signal producing systems can be found in U.S. Pat. No. 5,185,243, which is hereby incorporated by reference herein.

The label and other signal producing system members (if present) may be bound to the affinity partner, tyramide molecules, a support, and/or may become bound to a cell. The binding may be direct or indirect, covalent or non-covalent and may be accomplished by well known techniques, commonly available in the literature. Cells may be bound to a solid support in any manner known in the art, provided only that the binding does not substantially interfere with the ability of a biomarker on the cell to bind with an affinity agent. In some embodiments, the cells may be coated or covalently bound directly to the solid support such as membrane 12. Linking groups may also be used to covalently couple the solid support and the cells. Other methods of binding the cells are also possible. For instance, a solid support may have a coating of a binder for a small molecule such as, for example, avidin or an antibody, and a small molecule such as, e.g., biotin, hapten, etc., can be bound to the cells or vice versa.

After a rare cell is targeted directly or indirectly by a probe, the probe utilized for ICC and/or ISH may detected by a suitable detection system, such as a fluorescence microscope with excitation, emission, and cut-off filters specific for each probe, or any other suitable detection device known in the art. Multiple fluorescent probes, each with a different specific affinity agent, can be used in a cocktail to detect multiple bio-molecules of a target cell. Cells may then be characterized by the positive (fluorescent) or negative (non-fluorescent) response using a scanning fluorescent microscope. The methods allow using DAPI (4',6-diamidino-2-phenylindole) or Hoechst A fluorescent DNA stains to stain the nuclei of the cells and application cover media to help preserve the fluorescent intensity of the probes.

An automated chromogenic dye counterstaining procedure is based on the Hematoxylin & Eosin (H&E) methods widely used by pathologists that produce visible spectra that are viewed under a microscope with color camera. Hematoxylin & Eosin (H&E) are chromogenic dyes. Hematoxylin stains the nuclei of cells blue. Eosin Y stains the eosinophilic structures of cells in various shades of red, pink and orange. The use of chromogenic dyes for counterstaining or indirect immunoassay for is not compatible with fluorescence methods. The fluorescence of the immuno assay must be read prior to chromogenic dyes counter staining. Therefore, chromogenic dye staining can be done as a sequential step after the fluorescent signal is read.

Exemplary ICC, ISH, and H&E reagents and processes and the components used therefore are described fully in literature. For example, see Cytometry 2001, 43(2), p. 101-109; Cytometry 231-7 (1996); J Histochem Cytochem 2000, 48, 1369; M. Evans, BMC Clin Pathology 2002, 3, pp. 3-17; J. F. Swennenhuis et al., Cytometry Part A, 75A, pp. 5020-527, 2009; U.S. Provisional Application No. 61/806,581, entitled "Rare Cell Concentration"; U.S. Provisional Application No. 61/824,816, entitled "Particle Release Collection"; U.S. Provisional Application No. 62/003,758, entitled "Rare Molecule Signal Modification," the entirety of each of which is hereby incorporated by reference.

In addition to the probes for the ICC and/or ISH assay, the fluid delivery apparatus 18 may deliver one or more components necessary for the amplification of rare cell detection, such components necessary or useful for tyramide signal amplification (TSA), such as tyramide, HRP, and hydrogen peroxide, suitable buffers, washing reagents, and the like. Tyramide is a phenolic compound that, when activated by the enzyme horseradish peroxidase (HRP) in the presence of hydrogen peroxide, covalently binds to electron rich moieties on a surface (e.g., predominantly to tyrosine residues in proteins in tissue or cell preparations). Specifically, in the presence of small amounts of hydrogen peroxide, HRP converts tyramides into short-lived, extremely reactive tyramide intermediates. The activated molecules then rapidly react with and covalently bind to electron rich regions (typically tyrosine in the form of polypeptides chains of proteins) of adjacent proteins as described. This binding of activated tyramide molecules typically occurs immediately adjacent to the sites at which the affinity partner and activating HRP enzyme is bound. Multiple deposition of the labeled tyramide occurs in a very short time (generally within 3-10 minutes). Subsequent detection of the label, which may be linked to the affinity partner and/or the reactive tyramide molecules, yields effectively large signal amplification for rare cells. Other agents may be utilized to reduce background noise such as surfactants and blocking agents as are known in the art. The fluid delivery apparatus 18 may be configured to deliver tyramide, HRP, and any of the aforementioned components suitable for TSA amplification to the retentate 14 on the membrane 12.

The sample to be tested and placed on membrane 12 may be from any suitable source such as a blood sample for a mammal, which may itself be whole blood or plasma, for example. In certain embodiments, the blood sample is one have non-rare cells and the rare cells 15. Rare cells 15 are those cells that are present in a sample in relatively small quantities when compared to the amount of non-rare cells in a sample. In some examples, the rare cells are present in an amount of about $10^{-8}$% to about $10^{-2}$% by weight of a total cell population in a sample suspected of containing the rare cells 15. The rare cells 15 may be, but are not limited to, malignant cells such as malignant neoplasms or cancer cells; circulating endothelial cells; circulating epithelial cells; fetal cells; immune cells (B cells, T cells, macrophages, NK cells, monocytes); stem cells; nucleated red blood cells (normoblasts or erythroblasts); and immature granulocytes; for example.

Non-rare cells are those cells that are present in relatively large amounts when compared to the amount of rare cells in a sample. In some examples, the non-rare cells are at least about 10 times, or at least about $10^2$ times, or at least about $10^3$ times, or at least about $10^4$ times, or at least about $10^5$ times, or at least about $10^6$ times, or at least about $10^7$ times, or at least about $10^8$ times greater than the amount of the rare cells in the total cell population in a sample suspected of containing non-rare cells and rare cells. The non-rare cells may be, but are not limited to, white blood cells, platelets, and red blood cells, for example.

The samples to undergo analysis as described herein may be from any suitable source and be prepared and processed according to known methods in the art. In certain embodiments, the whole blood sample is first filtered so as to remove the majority of red blood cells, platelets and the like, to isolate rare cells (if present) by filtration apparatus 11. The remaining sample having the rare cells 15 typically also comprises a quantity of white blood cells. For example, in one embodiment, whole blood samples may be mixed with buffer and separated through filtration onto the membrane 12 to isolate rare cells (if present) with some non-rare cells (white blood cells), and no red blood cells.

Feedback Control

The inventors have found that ICC and ISH assays (individually or the combination of ICC/ISH) may be characterized by loss of assay components, such as by evaporation or the like. The evaporation may take place as a result of heating steps in the assay, for example. It has been found that the loss of components, such as the loss of probe in ICC and/or ISH assays, may contribute significantly to increased background noise in the detection of rare cells. Aspects of the present invention thus include feedback control for the system 10 that accounts for loss of reagents on the membrane 12.

To determine whether a greater than expected fluid loss on the membrane 12 has occurred, the system 10 may include one or more sensors in communication with a controller 24 programmed or having software/hardware for controlling the assay and any subsequent assays. As such, the controller 24 is configured to execute computer readable instructions to adjust parameters such as fluid delivery of a particular component from fluid delivery apparatus 18 or for control of temperature as described below. To accomplish this, the controller 24 comprises one or more inputs for receiving information from the one or the sensors described.

In certain embodiments, the controller 24 may comprise, for example, a special purpose computer comprising a microprocessor, a microcomputer, an industrial controller, a programmable logic controller, a discrete logic circuit or other suitable controlling device. In one embodiment, the controller 24 comprises input channels, a memory, an output channel, and a computer. As used herein, the term computer may include a processor, a microcontroller, a microcomputer, a programmable logic controller (PLC), an application specific integrated circuit, and other programmable circuits. The memory may include a computer-readable medium or a storage device, e.g., floppy disk, a compact disc read only memory (CD-ROM), or the like. The controller 24 comprises computer readable instructions for performing any aspect of the methods or for controlling any aspect of the system 10 described herein.

Figure 2:
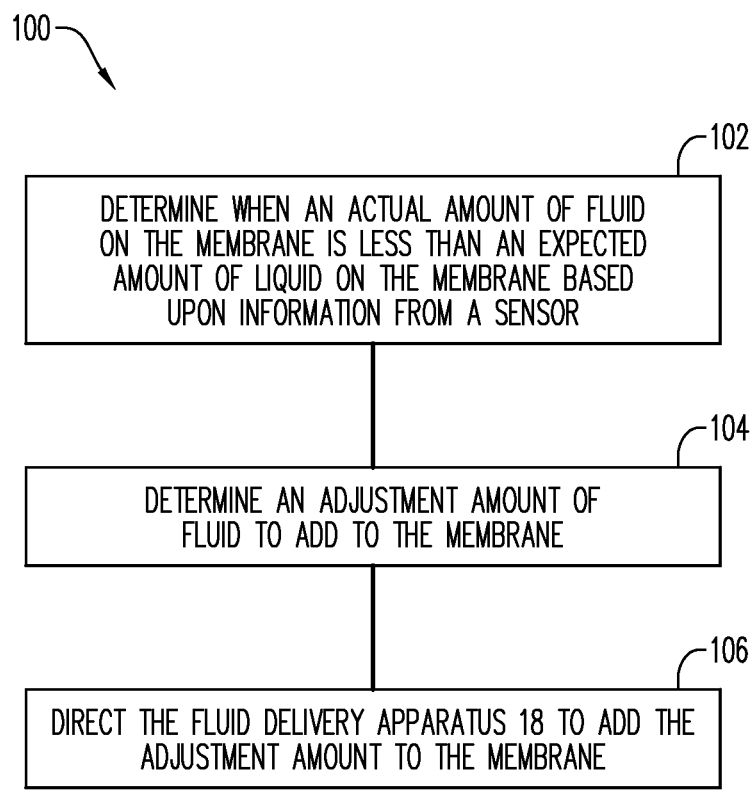
FIG. 2 illustrates a feedback control method in accordance with an aspect of the present invention.

In an embodiment, the controller 24 may include instructions for carrying out an algorithm 100 such as that shown in FIG. 2. As shown, the controller 24, e.g., an electronic control circuit may comprise instructions to:
 a) determine 102 when an actual amount of fluid on the membrane 12 is less than an expected amount of fluid on the membrane based upon information from a sensor, e.g., sensor 20;
 b) determine 104 an adjustment amount of fluid to add to the membrane 12; and
 c) direct 106 the fluid delivery apparatus 18 to add the adjustment amount to the membrane 12.

Various methods may be utilized to determine that an actual amount of fluid on the membrane 12 is less than an expected amount of fluid on the membrane based upon information input to the controller 24 from one or more sensors. In an embodiment, one or more pressure sensors are provided to determine when less fluid is disposed on the membrane 12 than expected. In other embodiments, a fluid level sensor may be utilized to determine that less than an expected amount of fluid is on the membrane 12 at a point of time over a time range. In still other embodiments, one or more temperature sensors may be instead or also provided. Each sensor may be communication, direct or wirelessly, to the controller 24.

Figure 1B:
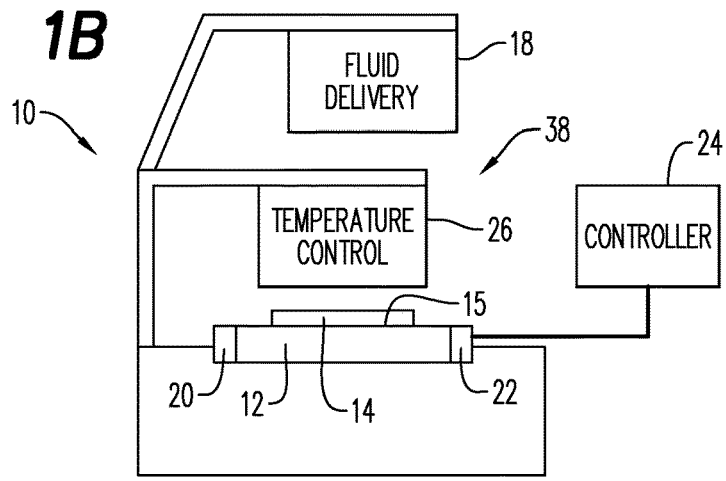

As mentioned, in a particular embodiment, the system 10 may comprise one or more pressure sensors to identify when a loss of fluid has occurred. For example, as shown in FIGS. 1A-1B, one or more pressure sensors 20 may be disposed on or about the membrane 12 to determine a pressure at which fluid passes through the membrane. In one embodiment, the pressure sensor 20 comprises a pressure differential sensor that determines a pressure differential between an upstream and downstream region of the membrane 12. For example, a single pressure differential sensor may be positioned so as to measure a pressure differential upstream of (above) the membrane 12 and downstream of the membrane 12. By way of example only, a region upstream of the membrane 12 may comprise a location of introduction of fluid to the membrane 12 and a region downstream of the membrane 12 may comprise an outlet or drain for the membrane 12.

Figure 3:
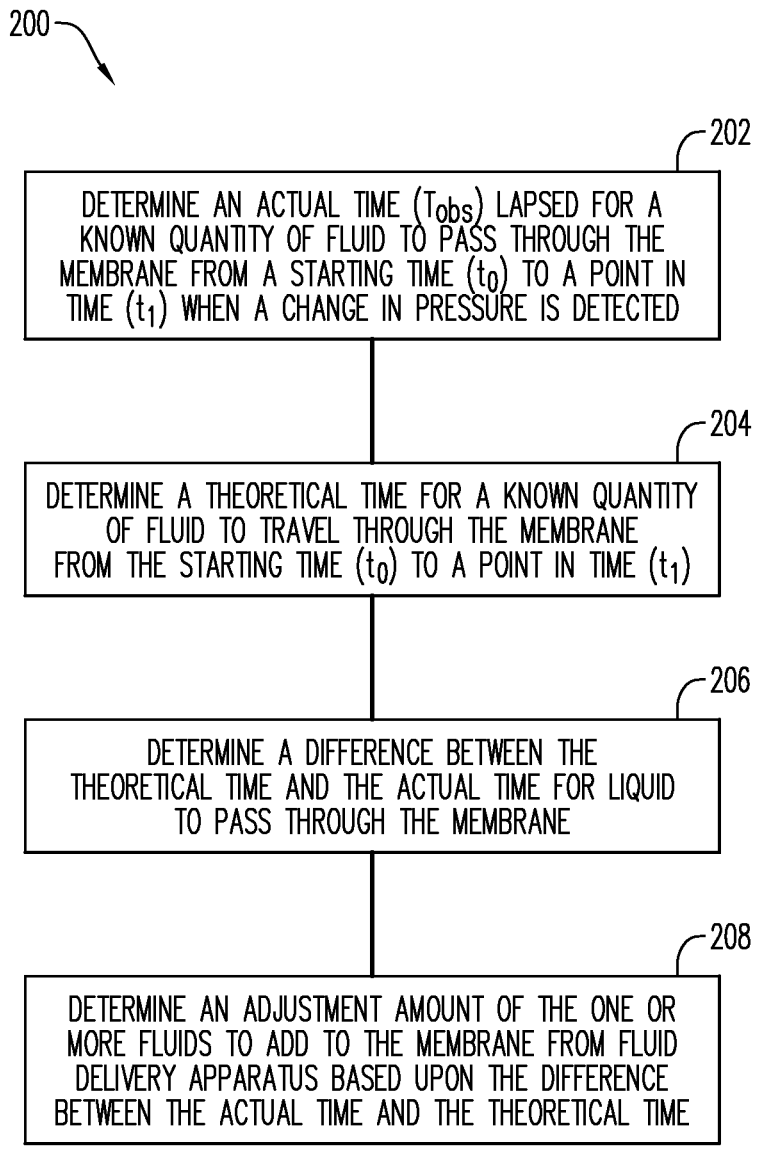
FIG. 3 illustrates another feedback control method in accordance with another aspect of the present invention.

Upon a change in pressure sensed by sensor 20, the controller 24 may be programmed to determine 104 an adjustment amount of fluid to add to the membrane 12; and direct 106 the fluid delivery apparatus 18 to add the adjustment amount to the membrane 12. To accomplish this, the controller 24 may be programmed to carry out an algorithm 200 as shown in FIG. 3. As shown, the algorithm 200 includes determining 202 an actual time ($T_{ubs}$) lapsed for a known quantity of fluid to pass through the membrane 12 from a starting time ($t_0$) to a point in time ($t_1$) when a change in pressure is detected by the pressure sensor 20. In certain embodiments, the change in pressure is indicative of a state where the pressure on or about the membrane 12 or the pressure differential above/below the membrane 12 is greater than, less than, or within a set amount from a predetermined threshold value.

The starting time ($t_0$) may be the point in time at which the addition of a first amount of fluid to the membrane 12 takes place, or may be any other known point in time where an amount of fluid added to the membrane 12 is known. The selection of the point in time may be selected manually or automatically. The point in time ($t_1$) at which a pressure change is detected may be one at which the controller 24 receives an indication (e.g., input) from the pressure sensor 20 of a pressure greater than, less than, or within a set amount from a predetermined threshold value. In a particular embodiment, the predetermined threshold pressure value is indicative of a state where no further fluid is passing through the membrane 12. Thus, if the pressure falls to the predetermined threshold value, or within a stated amount of the predetermined threshold value, there is provided an indication to the controller 24 that little to no fluid is disposed the membrane 12.

As shown in FIG. 3, the algorithm 200 may further include determining 204 a theoretical time for a known quantity of fluid to travel through the membrane 12 from the starting time ($t_0$) to the point in time ($t_1$). In certain embodiments, the theoretical time is measured empirically by sensing the pressure in a waste container (see FIG. 6) after the passage of one or more liquids (see FIG. 7). This measurement may be made after been pre-wetting the membrane 12 with alcohols, e.g., isopropopanol (IPA), to remove any contaminants from the membrane 12.

Figure 6:
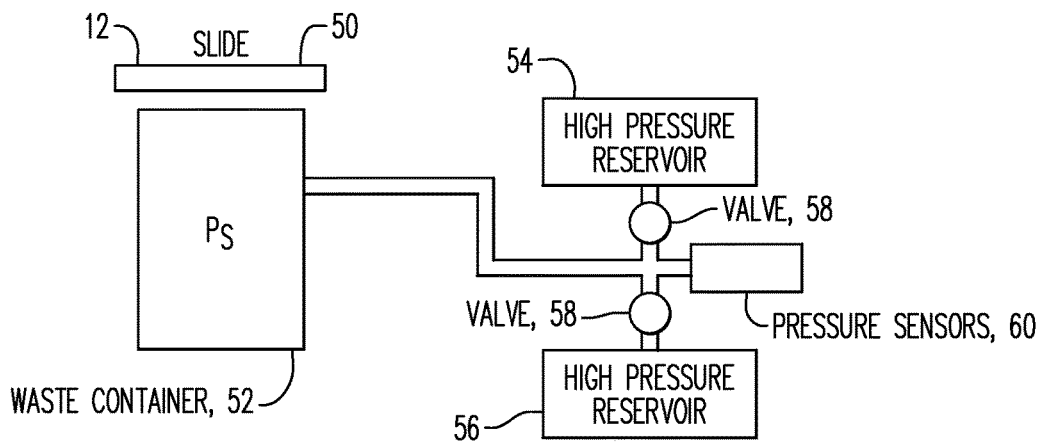
FIG. 6 illustrates sensor position in the system in accordance with an aspect of the present invention.

Referring to FIG. 6, there is shown an exemplary configuration for measuring pressure in accordance with an aspect of the present invention. In particular, FIG. 6 shows the membrane 12 (in the form of a slide 50) over a waste container 52. The slide 50 is sealed to the waste container 52 such that a vacuum pressure can be generated (Ps). The waste container 52 is connected to a high pressure reservoir 54 to allow venting to atmospheric pressure (1000 mbar) and over pressure (>1000 mbar). The waste container 52 is also connected to a low pressure reservoir 56 to allow vacuum as an under pressure (>1000 mbar). Either reservoir 54, 56 can be applied to generate Ps which is either over or under pressures through the opening and closing of respective valve 58. The Ps is measured accordingly by one or more pressure sensors 60 as shown.

The theoretical time for which a known quantity of fluid should pass through the membrane may be based upon a known volume of liquid with a known vapor pressure, density, and flow rate. For example, the theoretical value may be measured empirically for a fixed reference temperature and relative to water. This can be adjusted based on empirically derived equations accounting for volume, vapor pressure, surface tension, liquid density, and flow rate. The theoretical time may also be directly dependent on temperature and may be (for any observed temperature) applied by a calibrated curve of empirically observed times vs. temperature.

Figure 7:
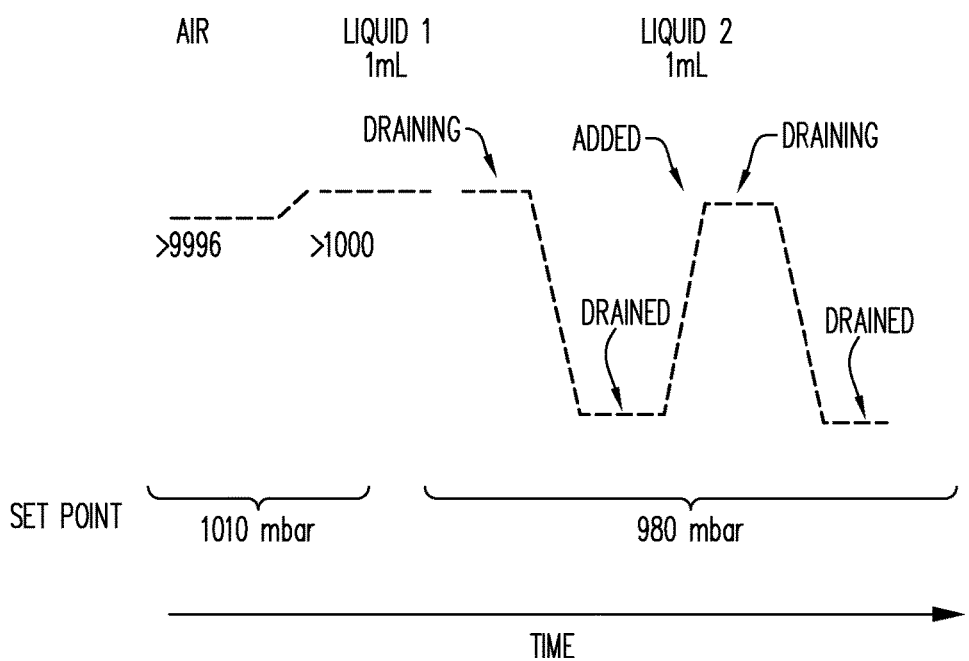
FIG. 7 illustrates a process for calculating a theoretical time for liquid drainage to occur in accordance with an aspect of the present invention.

Referring to FIG. 7, for example, FIG. 7 shows the behavior of Ps over time during the measurement of theoretical time. The slide 50 is sealed to the waste container 52 at time 0 and over pressure is applied, for example 1010 mbar. The pressure sensor 60 measures a change shown by the dotted line. Liquid 1, typically IPA, is applied to the top of the slide 50 in the over pressure situation, then an under pressure (vacuum) is applied, for example 980 mbar. Liquid 1 starts to drain and when draining is complete, the pressure sensor 60 read will reach the applied under pressure, in this case 980 mbar. This is repeated with a second liquid, typically water, and measure pressure returns to >1000 mbar due to the liquid on the slide. In an embodiment, the time it takes for second liquid to drain may be considered to be the ideal or theoretical time that the drainage should occur.

Next, the algorithm 200 may include determining 206 a difference between the theoretical time and the actual time for liquid to pass through the membrane. A difference between the theoretical time and the actual time may be expressed as a percentage according to the following formula, for example:

$$((T_{obs}-T_{exp})/T_{exp}) \quad (I)$$

A difference between the theoretical time ($T_{obs}$) and the actual time ($T_{exp}$) (or vice-versa) may be indicative of a more rapid than expected loss of a known quantity of fluid through the membrane 12. As a result of the more rapid than expected loss of fluid, it is likely that in an ICC/ISH or in an ISH assay, a greater than desired amount of background noise may be present and/or that there may be a reduced amplification or detection of rare cells due to the presence of a lesser amount of probe and/or labels than is desired, or an imbalance of components for the assay.

In certain embodiments, the difference (expressed as a %, for example) between the theoretical time and the actual time for liquid to pass through the membrane (($T_{obs}-T_{exp}$)/$T_{exp}$) may be utilized to how much additional fluid should be added to the membrane 12 to bring the concentration of the components and volume of the fluid on the membrane 12 back to optimal values. This is particularly important during the incubation of an affinity solution—whether ICC antibodies or ISH probes. In these cases, additional affinity solution with additional probe, additional affinity solution lacking additional probe, or additional hybridization solution with or without probe may be added based on liquid level during this period. Alternatively, a solution such as mounting media with a higher vapor pressure can be added instead of additional hybridization or affinity solution. This is particularly important when using higher temperatures, e.g., >50° C. In this way, aspects of the present invention allow for correction of the evaporation rate of fluids in the ICH assay and/or ISH assay by addition of further fluid(s).

To provide for optimized rare cell detection, the algorithm 200 further includes determining 208 an adjustment amount of the one or more fluids to add to the membrane from fluid delivery apparatus 18 based upon the difference between the actual time and the theoretical time. In certain embodiments, the adjustment amount is represented by a percentage for each component. For example, if it is found that fluid traveling through the membrane traveled through 10% faster than expected or was utilized 10% faster than expected, 10% of each component may be added to the membrane 12 and/or 10% of the expected volume may be added back in the form of one or more components. The adjustment amount may be added independently from a scheduled protocol or may be added to the standard amounts set forth in an assay protocol. Once the adjustment amount is determined, the algorithm 200 may include directing 210 fluid delivery apparatus 18 to add the adjustment amount to the membrane 12 over a predetermined time frame.

The aforementioned embodiment demonstrated the use of a pressure sensor and a time differential to determine an adjustment amount of liquid to the system 10 to correct for fluid loss. It is understood, however, that the present invention is not so limited. Any other suitable method for determining a fluid loss in the system may be utilized. For example, in another embodiment, a fluid level sensor is utilized to determine an actual fluid level. This value may be compared to a theoretical, expected, and/or estimated value for the fluid level and an adjustment amount of fluid may be added to the membrane based upon the difference between the actual and theoretical fluid amounts. The additional fluid may be additional affinity solution with or without additional probe, additional hybridization solution with or without probe, mounting media, or any other suitable fluid, including those useful in the ICC and/or ISH detection of rare cells.

To illustrate an embodiment utilizing such a fluid level sensor, FIG. 4 shows an exemplary schematic of another system and method in accordance with an aspect of the present invention. As shown, in the system 300, a sample 27 is prepared with buffer 28 as is known in the art. Thereafter, the sample 26 may undergo a filtration process to separate a quantity of rare cells, e.g., cell 15, from non-rare cells. The rare cells 15 are typically retained within a retentate 14 on top of a membrane 12. The rare cells 15 are contacted with ICC/ISH reagents 30, such as an affinity agent and a probe, and optionally a signal enhancing agent (e.g., tyramide, HRP) for carrying out an ICC and/or ISH rare cell detection assay. The reagents 30 are then subjected to a heating protocol effective to render the cells optimally detectable downstream by a temperature control element, e.g., a heater 32, disposed above the membrane 12.

During the heating, the temperature may be continuously or periodically monitored by one or more temperature sensors 34 on or about the membrane. In addition, a fluid level sensor 36 may detect an actual fluid level in the assay well, for example, to determine an actual fluid volume on the membrane 12. This value is compared to a target or estimated fluid level and an adjustment amount of fluid is determined if the estimated fluid level is greater than the actual fluid level. The controller 24 as described above directs a fluid delivery apparatus 18 to add the adjustment amount to the membrane 12. The additional fluid may be additional affinity solution with or without additional probe, additional hybridization solution with or without probe, mounting media, or any other suitable fluid, including those useful in the ICC and/or ISH detection of rare cells. Heat is then reapplied to finish the temperature protocol if necessary. Once the temperature protocol is completed, liquid on the membrane 12 is removed under until a pressure sensor 38 on or about the membrane 12 indicates that the fluid is drained which forms permeate 16. As shown, steps 3-8 as illustrated may be repeated as needed for ICC/ISH assays.

The aforementioned embodiment introduces the inclusion of a temperature control element. It is appreciated that after the adjustment amount is added, the additional fluid on the membrane will likely change the temperature on or about the membrane, which could detrimentally affect assay results. Further, it is appreciated that ICC and ISH assays benefit from a stable operating temperature for particular steps, e.g., hybridization. In certain embodiments, the systems described herein, e.g., system 10 may also comprise a temperature control element 26 as was shown in FIGS. 1A-1B for providing a consistent and reliable heating or cooling of the membrane 12 without disruption of pressure on the membrane 12. The temperature control element 26 may comprise any suitable heating or cooling source as is known in the art such as a peltier element, an IR LED, or a heat ring.

In an embodiment, the temperature control element 26 is advantageously configured to move between a first position 38 disposed over the membrane 12 as shown in FIG. 1B and a second position 40 as shown in FIG. 1A where the temperature control element is 32 is not disposed over the membrane 12. Any suitable structural arrangement can be provided for allowing the temperature control element 26 to be moved over the sample from the first position 38 to the second position 40 such as disposing the temperature control element 26 on a pivotable or slideable arm. For example, the temperature control element 26 may have a rest or park position, which is disposed on the side of a well of the associated apparatus. This park position allows the temperature control element 26 to be moved out of way for liquid addition when desired. In the case of liquid added by a pipette, the pipette movement must not be impeded.

While cooling elements are possible for the heater, they are not necessary as the liquid temperature can quickly cool the membrane 12 back to room temperature when the heater is off. The position of the heater when on the liquid well is important such that the target temperature can be reached in a minutes, such that evaporation is limited and the well is sealed, such that the liquid is not touched or contaminated in any ways. For example, a flanged heater cylinder that encircles the polypropylene waste shelve but does not touch the membrane or liquid on the membrane 12 used. In an embodiment, a flange of the temperature control element 32 is configured to rest on the metal lid of filtration units which seals vacuum between the slide to waste container.

With this arrangement of the temperature control element 26, improved control of the assay components can be provided since heating/cooling can be stopped when temperature control is not needed. Moreover, it is contemplated that movement of the temperature control element 26 to a position out of the way of the membrane 12 in the second position 40 will allow space for the fluid delivery apparatus 18 to add additional components to the membrane 12 as necessary.

By way of example only, the movable temperature control element 26 allows for the pipetting of various fluids on the membrane for filtration and ICC/ISH rare cell detection from a top position of the membrane 12 in the second position 40. Thereafter, the temperature control element 26 may be moved back into the first position 38 disposed over the membrane 12. Advantageously also, if pressure is applied on the membrane 12 from a position below the membrane 12 (e.g., to dry the membrane), the membrane 12 is not disturbed and can be kept stable over the assay even if the temperature is changed over the assay since the temperature control element 26 is disposed over the membrane. Further, in contrast to heating elements positioned under the membrane 12, no drainage holes need to be provided in the temperature control element 26. This results in more regular heating of the membrane.

Figure 5:
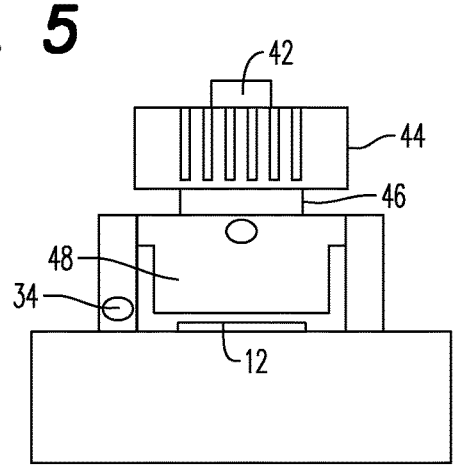
FIG. 5 illustrates a heating temperature element exemplary temperature control element in accordance with an aspect of the present invention.

An exemplary temperature control element 26 is shown in FIG. 5 and may include a fitting, such as a Hamilton adapter 42, for attaching the temperature control element 26 to a component of the system 10 over the membrane. The temperature control element 26 may further include a cooling element such as an aluminum cooler 44, a heating element such as a Peltier element 46, and a heat transfer element such as an aluminum block 48 that collectively provide a desired temperature output for the temperature control element 26. It is appreciated that the temperature control element 26 will be disposed over, but not contact the membrane 12. Temperature sensors 34 may be associated with the temperature control element 34 as desired to monitor the output temperature thereof.

It is appreciated that the controller 24 may also be programmed with instructions for carrying out an algorithm that changes the temperature applied to the membrane 12 (heating and/or cooling), as well as to adjust the volume of fluid on the membrane. To accomplish this, the controller 24 may be in communication with any sensors, e.g., temperature sensors 34, included in the system. In particular embodiments, the controller 24 is programmed with instructions for carrying out a temperature protocol, including but not limited to temperature gradient protocol. The temperature protocol may include slow heating, fast cooling, fast heating and/or slow cooling to the membrane. In certain embodiments, the temperature protocol may correspond to a predetermined temperature program as required for an ICC and/or ISH assay that comprise enzymatic steps that require defined temperatures.

EXAMPLES

Examples are provided hereinbelow. However, it is understood that the description herein is not to be limited in its application to the specific experimentation, results, and laboratory procedures. Rather, the Examples are simply provided as one of various embodiments and are meant to be exemplary, not exhaustive.

2.1 Sample Preparation

Blood samples of ~10 mL were collected from patients following an IRB approved protocol using Blood Collection Tubes and tube holders containing K3EDTA & 0.45 ml Transfix (Vacutest Kima TVT-09-50-45). Tubes were inverted 10 times after collection. The samples were stored at RT for up to 5 days before isolation and if shipped, the samples were kept between 10-25° C. during shipping. The blood samples were added to a 50 mL centrifuge tube and QS to 20 mL with PBS fibrin solution. The H226 or H2228 lung cancer cell line or SKBR breast cancer cell line (ATCC) was used to test the response of the assay. These cells were added at 50, 200, 400, and 800 cell counts per blood tube.

2.2 Isolation & Fixation

Isolation of fixation of the rare cells was accomplished according to the following protocol:
Pre-wetting with 1 mL of IPA to slide
1× washing with PBS,
Filtration of blood sample 10× washing with 1 mL of PBS,
1× washing with 1 mL of 4% formaldehyde in PBS,
Incubation with 4% formaldehyde in PBS (*20 min)
2× washing with 1 ml of PBS incubate each for 1 min Slides were removed and safely stored prior to ICH and ISH.

2.3 Immunocytochemistry (ICC)

Antibody binding reactions with cells were done after the cells were permeablized to allow antibodies to reach corresponding antigens on the cells. Hydrogen peroxide may be used to for removal of endogenous peroxidase activity which can help the specificity of the antibody conjugated to HRP are used. Finally, the cell was blocked from non-specific binding using a blocking agent like casein.

- 1× washing with 1 mL of 0.2% TritonX in PBS for permeabilization
- Incubation with 1 mL of 0.2% TritonX in PBS (7 min)
- 5× washing with 1 mL of PBS
- Incubation with 1 mL of 3% $H_2O_2$ (30 min) (optional)
- 5× washing with 1 mL PBS
- Incubation with 1 mL Blocking Buffer (25 min) for preventing binding of label to non-rare cells
- 2× washing with 1 mL of PBS-T In the next step, the antibodies were added to the affinity solution. These can be antibodies without labels, antibodies with labels, and antibodies with enzymes. For example, monoclonal mouse antibodies for CK8/18/19 rare cell type biomarkers were labeled with DyLight550 and monoclonal mouse antibodies for CD45 non-rare cell type biomarkers were labeled with DyLight650. Additional enzyme conjugates and other labels can be used. The protocol was as follows for adding antibodies to the affinity solution.

- Incubation with 260 µl affinity solution (25 min) slides were heated to 37° C.
- Additional affinity solution lacking additional antibodies is added based on liquid level during this period.
- 5× washing with 1 mL of PBS-T

2.4 In-Situ Hybridization (ISH)

The basic principle for in situ hybridization (ISH) is to utilize the probe to detect specific nucleotide sequences within cells. The sensitivity of the technique is such that threshold levels of detection are in the region of 10-20 copies of mRNA per cell or one DNA gene. This step is performed after the ICC and includes the following exemplary protocol.

Step A: Protease treatment was used. Pepsin (Sigma Product No. P6887, 40 units/ml in 10 mM HCl), or protease treatment (like trypsin, protease K) is typically used for ISH methods to expose the nucleic acids. Without cross linking the antibody chemically, the structural integrity of the antigen and antibodies are destroyed. Pepsin has the advantage that it can be easily inactivated by pH changes and the reaction is easier to control. A stock solution of 10% pepsin in water (or 50% glycerol) may be prepared at one time, aliquoted and stored for years at about 20° C. The working solution was 0.005% enzyme in 0.01N HCl. Incubation time was 1 minute for chemically aged slides and 10-15 minutes for slides aged overnight at 65° C., and was followed by incubation in PBS and ethanol series lasting a few seconds. Trypsin can also be used at 0.5-1 mg/ml in isotonic buffer, similar to the banding protocol. After 3-10 seconds incubation, enzyme activity was stopped by washing with saline-sodium citrate buffer (SSC: 3 M NaCl, 0.3 M sodium citrate, pH 7, or Product No. S6639).

The protease treatment protocol used is as a follows:
- 260 µl protease (Pepsin) solution at RT added to slide at ~35-40 C for 5-15 min
- 5× washing with 1 mL of SSC incubate each for 1 min
- 2× washing with 1 mL of water incubate each for 1 min (optional wash)

Step B. RNase A treatment was used. When probing for mRNAs, an RNase treatment step is often added to determine that the binding is specific to RNA by digesting the cells with RNases prior to hybridization with the oligonucleotide probe. The absence of binding after RNase treatment indicates that binding was indeed toRNA within the tissue. Another commonly observed pre-treatment when using RNA probes is acetylation with acetic anhydride (0.25%) in triethanolamine. This treatment is thought to be important for decreasing background but it also appears to inactivate RNases and may help in producing a strong signal.

The RNase treatment protocol used was as follows:
- Incubation with 260 µl Ribonuclease (RNase) for 1 hour at 37° C. (Sigma Product No. R4642 at 100 µg/ml in 2×SSC)
- 5× washing with 1 mL of SSC
- Rinse slides in 10 mM HCl.

Step C. Hybridization and washing is typically required for any ISH method. The hybridization process is critical in controlling the efficiency of the probe to anneal to a complementary target RNA or DNA strand just below its melting point ($T_m$). The target nRNA or DNA and the probe can be simultaneously denaturized using a chemical hybridization solution. The probe can be annealed at the melting point along with blocking competitor DNA which might be used as option to reduce non-target binding to repetitive sequences. The most common suppressor DNAs tested were Cot1 DNA (Life Technologies) and salmon sperm DNA (Sigma). Repetitive sequences (especially Alu and L1 families in human) have to be blocked with competitor DNA prior to FISH. Additional control probe or multiple target probes can also be added. Hybridization solution temperatures can be varied from at 25 to 100° C. over time periods of 5 min to 25 hours.

The hybridization solution may be 70% formamide/2× SSC, pH 7.0-8.0. Alternatively, the target DNA may be denatured 5 minutes at 75° C. using only hybridization solution, then annealed at 40 to 100° C. for 5 min to 25 h depending on melting temperature. A competitor DNA was chosen so as to allow repetitive sequences to hybridize. Prior to use, slides were aged for 8 hours at 65° C., then pretreated 10 minutes in pepsin (some slides) and denatured 2 minutes at 75° C. (some slides). An alternative hybridization mix solution may be used which is: 50% formamide (Product No. F7508), 10% dextran sulfate (Product No. D8906), 0.1% SDS (Product No. L4390). The label probe can be 0.5-1.5 ng/µl probe and the blocking probe can be 300 ng/ml (Salmon Sperm DNA Product No. D7656) in 2×SSC.

Post hybridization washes were done at RT to 65° C. to remove unbound probe. Post-Hybridization Wash Buffer (2×SSC/0.3% NP-40): Mix 3 ml of NP-40 with 100 ml of 20×SSC. NP-40 is a commercially available detergent. The full name of NP-40 is Tergitol-type NP-40, which is nonyl phenoxypolyethoxylethanol. The total volume was brought to 1,000 ml with purified water and pH adjusted 7.0-7.5 with 1N NaOH.

In one example, EGFR/CEN-7 FISH Probe Mix (Y5500 Dako North America, Inc. Carpinteria, Calif.) was used with the H226 cells. This was a dual DNA probe, The FISH Probe Mix detects the copy number of the EGFR (epidermal growth factor receptor) gene located on chromosome 7p11.2, spanning approximately 188 kb and containing 28 exons and used chromosome 7 centromere region as a reference. This probe mix consists of a 196 kb Texas Red-labeled DNA probe covering the full EGFR region, and a mixture of fluorescein-labeled PNA probes targeted at the centromeric region of chromosome 7. The specific hybridization to the two targets results in formation of a distinct red fluorescent signal at each EGFR gene and a distinct green fluorescent signal at each centromeric region of chromosome 7. To diminish background staining, the Probe Mix also contains unlabeled PNA oligos directed towards repetitive sequences. The reagent is provided in liquid form in hybridization solution containing 45% formamide, 10% dextransulphate, 0.21% N-methyl-2-pyrrolidon, 300 mmol/L NaCl, 5 mmol/L phosphate, and blocking agent.

The DNA hybridization protocol used for EGFR is as a follows:

No protease or RNA treatment is performed
The slides is 2× washing with 1 mL of water incubate each for 1 min (unless previously last washed)
33 uL EGFR/CEN-7 FISH fluorochrome-labeled probe in hybridization solution was pipetted onto the slide area to be hybridized
Slides were heated to 82° C. for 5 min followed by incubation for 1 to 12 h at 60° C. Additional hybridization solution lacking probe is added based on liquid level during this period. Alternatively mounting media can be added instead of additional hybridization solution.
5× washing with 1 mL of stringent wash buffer (2×SSC/ 0.3% NP-40) at 25-60° C.

Another example used is the ALK DNA Probe, Fluorochrome-Conjugated (Y5417) for the H2228 cells. The human ALK gene consists of 29 exons spanning a region of ~728 kb on chromosome 2 band p23. Y5417 is a probe based on a combination of DNA and PNA technology, and contains a two-part fluorochrome-conjugated DNA probe and unlabeled PNA blocking probes. The fluorochrome-conjugated DNA probe is a Texas Red-labeled DNA probe (ALK-Downstream) covering 289 kb telomeric to the ALK breakpoint cluster region and a fluorescein-labeled DNA probe (ALK-Upstream) covering 557 kb centromeric to the ALK breakpoint cluster region.

In another embodiment of the above method, the above ISH method was done using a branched DNA signal amplification assay. For example, a CTC scope Kit (Advance Cell Diagnostics) was used. This kit is based on the branched DNA signal amplification assay. A RNA specific oligo probe is hybridized to target RNA in cells as the "capture probe." In this example, her2Neu RNA was detected in SKBR cells. This probe is followed by pre-amplification reagents and a series of amplification "extender" reagents, which use single strand DNA molecules to generate a multiple layered complex. Each "extender" has two domains, one that hybridizes to the previous DNA molecule and one that connects to the next layer. Once the complex is complete, a DNA molecule labeled with fluorescent probe is captured so the signal can be detected. The automation procedure was expanded to allow use of four amplification layers after the target probe hybridization solution. Each step is incubated for a set temperature and time then washed. This method does use a protease treatment step The b-DNA hybridization protocol used for her2nue was as follows:

Incubation with1 mL of 0.2% TritonX in PBS (*7 min) (if not previously permiabilized)
2× washing with 1 ml of PBS incubate each for 1 min
260 µl CTC Scope RTU protease solution at RT to *40 C for 5 min
2× washing with 1 mL of water incubate each for 1 min
Incubate 260 µl RTU target probe hybridization solution at 40° C. for *180 min
3× washing with 1 mL of CTC Scope buffer incubate each for 2 min at RT
Incubate 260 µl CTC Scope RTU Amp1 solution at 40° C. for *40 min
3× washing with 1 mL of CTC Scope buffer, incubate each for 2 min at RT
Incubate 260 µl CTC Scope RTU Amp2 solution solution at 40° C. for *15 min
3× washing with 1 mL of CTC Scope buffer, incubate each for 2 min at RT
Incubate 260 µl CTC Scope RTU Amp3 solution solution at 40° C. for *30 min
3× washing with 1 mL of CTC Scope buffer, incubate each for 2 min at RT
Incubate 260 µl CTC Scope RTU Amp4 solution solution at 40° C. for *15 min
3× washing with 1 mL of CTC Scope buffer, incubate each for 2 min at RT 2.5 Nuclei Staining and Mounting Media Nuclei staining is typically done for either the ICC or ISH procedures. 4',6-diamidino-2-phenylindole (DAPI) is a fluorescent stain that binds strongly to A-T rich regions in DNA. It is used extensively in fluorescence microscopy. Alternatively, Hoechst 33342 stain is part of a bis-benzimides family of blue fluorescent dyes used to stain DNA. If nuclei staining is already done for ICC, then it does not need to be repeated for ISH. After nuclei stain, the fluorescence signal of the labels is protected using mounting media such as glycerol based mixtures with DAPCO or 1,4-diazabicyclo [2.2.2]octane, which prolongs fluorescence. The nuclei staining and mounting media protocol used for all ICC and ISH methods was as follows:

Incubation with 260 µl DAPI for 20 sec (nucleus staining)
2× washing with 1 mL PBS
add 33 µl mounting media glycerol/DAPCO 2.6 Optional TSA Amplification Procedure for ISH or ICC In an embodiment of the above method, a fluorescence amplification step was added using a commercially available Tyramide Signal Amplification Kit (Molecular Probes, Nr.: T-20916, T-20936 and T-30954). For ISH amplification, a probe with biotin was reacted with a steptavidin-HRP-conjugate and the cells reacted with tyramide-Alexa488. In either ICC and ISH methods, the TSA reaction is done by 25 min incubation at RT of 260 µl of tyramide-Alexa488 in 0.0015% hydrogen peroxide (25 min) (Amplification step 3) and washing 5 times with 1 mL of 0.2% TritonX in PBS to wash away unbound tyramide-Alexa488. The reacted slide is then incubated with 500 µL of DPAI and washed twice with 1 mL of PBS-T to wash extra DAPI. For an ICC amplification example, an antibody with biotin is reacted with a steptavidin-HRP-conjugate in the same sequence.

2.7 Methodology of Microscopic Measurement of Cell Signal

Examination of slides under a fluorescence microscope with proper filter sets was conducted. The measurement of an amount of signal obtained in any of the above assay methods for rare comprises of measuring two or more biomarker is correlated with the level of disease in the subject. This measurement is explained more fully as follows: To first determine if the cell of is of interest using a rare cell marker with separate distinct signal and by comparison to a non-rare cell marker in a second separate distinct signal, the rare cells are counted when the rare cell signal is above a threshold and the non-rare signal is below a threshold. The threshold is defined as the point at which the signal is detectable over the noise. The noise in this case is the background signal on the filtration matrix. An additional separate distinct signal for other rare cell features can be measured for each rare cell. The rare cells with additional rare cell features signal above the threshold are counted as a rare cell with this feature. The filtration process allows all signals to be measured simultaneously. A separate signal threshold is selected for each determination of whether a cell is a rare cell, a non-rare cell or whether a rare has additional feature. The non-rare signal threshold is established using a negative control with non-rare. The rare cell and additional feature signal thresholds are determined using a positive control with non-rare cell and cultured rare cells that are fixed with the additional feature. Signals below the threshold are set to zero. The unknown sample was run and only the additional feature signals above the threshold measured on cells that are rare cell positive and non-rare negative cells.

The above methods may be employed to determine a potential of a mammalian subject for exhibiting disease. The signal obtained in any of the above assay methods for rare cell comprising one or more additional features is correlated to the potential of a mammalian subject for exhibiting disease by measuring the rare cell and non-rare cell signals identifying the cells above the rare cell threshold and below the non-rare cell threshold. The additional feature signal on the rare cell is then measured if above the positive threshold. The numbers of rare cell are counted for each patient. If the signal for the feature is above the threshold for the feature, the cell is considered to have this feature. The higher the increase in the feature signal above the threshold, the greater is the feature for the rare cell. The higher the number of rare cell, the number of rare cell with features and the extent of additional features, the greater is the correlation the subject exhibiting disease versus subjects lacking disease.

2.8 Results

The following table lists the results of modifying an ICC/ISH method in accordance with aspects of the present invention.

TABLE 1

| Inventive step | Observed effect |
| --- | --- |
| No feedback addition for ISH | High EFGR background on White |
| Feedback addition for ISH | No EFGR probe background on cells other than H226 with mutation |
| No feedback addition for ICC | High CD45 white blood cell marker background on cancer cells |
| Feedback addition for ICC | No CD45 white blood cell marker background on cancer cells |

2.9 Optional Chromogenic Dye Counterstaining Procedure

To any of the above-described methods, a chromogenic dye staining (H&E) can be performed as regressive method with Harris hematoylin (Sigma Aldrich) or progressive method with Mayer's or Gill's solutions (ScyTeck Laboratories HAE-1-1FU or Diff-Quick Stain method) as known to those skilled in the art. This method must be performed after fluourescent measurements are made. The more complex regressive H&E was done by pre-washing the slide 2 times with 1 mL water. The slide was stained with for ICC and ISH or only contain fixed cells. Next, 500 μL of hematoxylin (Sigma Aldrich HHS 32) was incubated for 5 min followed by washing the slide 3 times with 1 mL water. Next, 500 μL of differentiation solution (Sigma Aldrich A 3179) was incubated for 1 min followed by washing the slide one time with 1 mL water. Next, 500 μL of bluing agent solution (Sigma Aldrich S5134) was incubated for 1 min followed by washing the slide 1 time with 1 mL water and 2 times with 1 mL 95% ethanol. Finally, 500 μL of (Eosin Y solution Sigma Aldrich HT110-1) was incubated for 1 min followed by washing the slide 1 times with 1 mL 95% ethanol.

Optional Capture Particle Procedure

In addition to the above shown procedure, freely circulating "Biomarkers" can be isolated by "capture particle" for ICC and ISH procedures shown above.

Whole blood specimens (about 8 mL) for testing were collected from healthy donors into tubes containing $K_3EDTA$ and 0.45 ml TRANSFIX® preservative, which also contained 1% paraformaldehyde (Vacutest Kima TVT-09-50-45). Cancer cells were harvested from tissue culture and a known number added to each blood sample. The SBKR cancer cell line (ATCC) was used for testing. These unfixed cells were lysed by sonication so that only cell free nucleic acids for CK19 and proteins for her2nue remained and were added at $10^4$(e.g. 10,000) to $10^8$ cell counts per blood tube. Blood tubes were spun down using a centrifuge and plasma removed (~3 to 5 mL). These plasma sample contained non rare cells (e.g. Peripheral blood mononuclear cells or buffy coat) in typical concentrations.

Prior to filtration, a plasma sample of (3-5 mL) was transferred to a 50 mL FALCON® tube, which was filled to 20 mL with PBS. This was followed by the addition of 25 uL of silica coated magnetic particles of 0.2 micron diameter into each tube (Siemens Healthcare Diagnostics, VERSANT Sample Preparation Reagents). Proteinase K solution can be used to inactivate nucleases that might otherwise degrade the DNA or RNA during isolation.

The diluted sample was placed into a filtration station and the diluted sample was filtered through the membrane of the filtration station as shown in Example 1 with the only differences be that the filtration membrane pore sizes ranged from 0.1 um and the vacuum applied varied from 1 to −500 mBar as the diameters of capture particle was 0.2 um. Using the ICC and ISH protocol described as shown in example 1, RNA, DNA and protein were measured on the membrane producing the same effects.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An automated system for filtration of a sample and for rare cell detection of a sample, the system comprising:
    a filtration apparatus comprising a membrane through which the sample is passed to provide a retentate suspected of having a quantity of rare cells;
    a fluid delivery apparatus that introduces a fluid onto the membrane for filtration or detection of the rare cells;
    at least one sensor disposed on or about the membrane to directly or indirectly indicate a level of fluid on the membrane; and
    an electronic control circuit configured to:
        a) determine when an actual amount of fluid on the membrane is less than an expected amount of fluid on the membrane based upon information from the at least one sensor;

b) determine an adjustment amount of fluid to add to the membrane; and
c) direct the fluid delivery apparatus to add the adjustment amount to the membrane.

2. The automated system of claim 1, wherein the controller is configured to:
   a) upon receiving an indication from a pressure sensor of a change in the pressure from a predetermined threshold value at a point in time, determine an actual time lapsed for fluid to travel through the membrane from a starting time to the point in time;
   b) determine a theoretical time for fluid to travel through the membrane from the starting time to the point in time, wherein a difference between the theoretical time and the actual time is indicative of a more rapid than expected loss of the fluid; and
   c) determine the adjustment amount of the fluid to add to the membrane from the fluid delivery apparatus based upon the difference between the actual time and the theoretical time.

3. The automated system of claim 2, wherein the predetermined pressure threshold value is a value that indicates all of the fluid less the retentate has passed through the membrane.

4. The automated system of claim 1, wherein the at least one sensor comprises a fluid level sensor.

5. The automated system of claim 4, wherein the electronic control circuit directs the temperature control element into the second position when the electronic control circuit directs the fluid delivery apparatus to add the adjustment amount to the membrane.

6. The automated system of claim 4, further comprising a temperature sensor disposed on or about the membrane, wherein the electronic control circuit is configured to adjust a temperature of the temperature control element based upon information from the temperature sensor.

7. The automated system of claim 1, further comprising a temperature control element movable from a first position over an upper surface of the membrane to heat or cool the membrane to a predetermined temperature to a second position away from the membrane, wherein the second position allows for the addition of fluid from the fluid delivery apparatus.

8. The automated system of claim 1, wherein the fluid comprises a member selected from the group consisting of a probe, a label, a reagent, a buffer, a wash solution, and combinations thereof.

9. The automated system of claim 1, wherein the one or more fluids comprise a component necessary for carrying out an ISH detection assay.

10. The automated system of claim 1, wherein the fluid comprises a component for carrying out an ICC rare cell detection assay.

11. The automated system of claim 1, wherein the fluid comprises a component for carrying out an ISH rare cell detection assay.

12. The automated system of claim 1, further comprising a detector for detection of the rare cells on the membrane.

13. An automated method for filtration of a sample and for rare molecules detection in the sample, the method comprising:
   a) passing a sample through a membrane to provide a retentate suspected of having a quantity of rare molecules;
   b) introducing a fluid onto the membrane for detection of the rare molecules;
   c) determining when an actual amount of the fluid on the membrane is less than an expected amount of fluid on the membrane;
   d) determining an adjustment amount of fluid to add to the membrane when the amount of the fluid on the membrane is less than the expected amount; and
   e) directing the fluid delivery apparatus to add the adjustment amount to the membrane.

14. The method of claim 13, wherein the determining when an actual amount of fluid less than an expected amount of fluid is done by:
   sensing a pressure at which liquid passes through the membrane;
   sensing of a drop in pressure below a predetermined threshold value at a point in time via the sensor;
   determining an actual time lapsed for the sample and the one or more fluids to travel through the membrane from a starting time to the point in time; and
   determining a theoretical time for the sample and the one or more fluids to travel through the membrane from the starting time to the point in time, wherein a difference between the theoretical time and the actual time is indicative of a more rapid than expected loss of the fluid.

15. The method of claim 14, wherein the adjustment amount is determined upon the difference between the actual time and the theoretical time.

16. The method of claim 13, further comprising providing a temperature control element movable from a first position over an upper surface of the membrane to heat or cool the membrane to a predetermined temperature to a second position away from the membrane, wherein the second position allows for the addition of the fluid from the fluid delivery apparatus.

17. The method of claim 16, further comprising directing the temperature control element into the second position when the electronic control circuit directs the fluid introduction station to add the adjustment amount to the membrane.

18. The method of claim 16, further comprising:
   providing a temperature sensor for sensing a temperature on or about the membrane; and
   adjusting a temperature output of the temperature control element based upon information from the temperature sensor.

19. The method of claim 13, wherein the fluid comprises a component for an ICC rare cell detection assay.

20. The automated system of claim 13, wherein the fluid comprises a component for an ISH rare cell detection assay.

* * * * *